US012656820B2

(12) United States Patent
Ding et al.

(10) Patent No.: US 12,656,820 B2
(45) Date of Patent: Jun. 16, 2026

(54) FOLDING ANGLE DETECTION IN A DEVICE

(71) Applicant: STMicroelectronics International N.V., Geneva (CH)

(72) Inventors: Yue Ding, Beijing (CN); Bin Fan, Beijing (CN); Pengcheng Wen, Beijing (CN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/781,165

(22) Filed: Jul. 23, 2024

(65) Prior Publication Data

US 2026/0029821 A1     Jan. 29, 2026

(51) Int. Cl.
*G06F 3/044* (2006.01)
*G06F 1/16* (2006.01)
*G06F 3/041* (2006.01)
(52) U.S. Cl.
CPC .......... G06F 1/1641 (2013.01); G06F 3/0418 (2013.01); G06F 3/0443 (2019.05); G06F 2203/04102 (2013.01)
(58) Field of Classification Search
CPC .... G06F 1/1641; G06F 3/0418; G06F 3/0443; G06F 2203/04102
See application file for complete search history.

(56) References Cited

U.S. PATENT DOCUMENTS

| | | | |
|---|---|---|---|
| 11,573,663 B1* | 2/2023 | Yun | G06F 1/1641 |
| 2015/0309618 A1* | 10/2015 | Keppel, Jr. | G06F 3/04182 |
| | | | 345/174 |
| 2018/0088633 A1* | 3/2018 | Whitman | G06F 1/1677 |
| 2021/0034200 A1* | 2/2021 | You | G01D 5/2417 |
| 2024/0167803 A1 | 5/2024 | Vandermeijden et al. | |
| 2025/0273105 A1* | 8/2025 | Argekar | G09G 3/006 |

FOREIGN PATENT DOCUMENTS

| | | |
|---|---|---|
| EP | 4216043 A2 | 7/2023 |

OTHER PUBLICATIONS

Extended European search report, EP Application No. 25189757.5, mailed Dec. 12, 2025, 10 pages.

* cited by examiner

*Primary Examiner* — Md Saiful A Siddiqui
(74) *Attorney, Agent, or Firm* — Slater Matsil, LLP

(57) ABSTRACT

According to an embodiment, a method for determining the folding angle of a foldable device is proposed. The device includes a touch controller, a display layer, and a touch-sensing layer. The device is foldable along a folding axis. A first portion is in contact with a second portion of the display layer in a fully closed position of the device. The method includes activating a mutual-capacitance sensing mechanism by configuring one or more channels of the touch-sensing layer parallel to the folding axis on the first portion of the display layer as transmit channels, and configuring one or more channels of the touch-sensing layer parallel to the folding axis on the second portion of the display layer as receive channels; collecting mutual-capacitance raw data measurements; determining the folding angle based on the mutual-capacitance raw data measurements; and activating a function or an application based on the folding angle.

20 Claims, 9 Drawing Sheets

FOLDING ANGLE IN DEGREES

600

900

FOLDING ANGLE IN DEGREES

1200

1000

1002 — SENSE ON

1004 — CREATE INITIAL BASELINE BASED ON RAW DATA AT FIRST FRAME AFTER SENSE ON

1006 — FRAME PROCESS GET NORMALIZED DATA = BASELINE − CURRENT RAW

1008 — IIR FILTERED DATA

1010 — DETERMINE SCOPE

INVALID → SET AN INVALID FLAG AND SKIP REPORT ANGLE AT CURRENT FRAME — 1016

VALID

1012 — MAP MUTUAL-CAPACITANCE FILTERED DATA TO FOLDING ANGLE

1014 — GET FOLDING ANGLE BY MUTUAL-CAPACITANCE

1300

1302 — DETERMINE SELF-SENSING FOLDING ANGLE

DETERMINE MUTUAL-SENSING FOLDING ANGLE — 1304

1306 — CALCULATE FOLDING ANGLE BASED ON WEIGHTED SELF-SENING AND MUTUAL-SENSING FOLDING ANGLES

1308 — REPORT FOLDING ANGLE TO HOST DEVICE

FOLDING ANGLE DETECTION IN A DEVICE

TECHNICAL FIELD

The present disclosure generally relates to electronic devices with foldable displays and, in particular embodiments, to detecting the folding state and angle of a foldable device.

BACKGROUND

Electronic devices designed for user interaction have traditionally relied on external input devices, such as keyboards, keypads, or mice, to capture user input. However, in recent years, there has been a shift towards more portable and flexible devices to accommodate consumers' evolving preferences. This trend has led to the rise of smaller, handheld electronic devices, such as mobile phones, tablets, and gaming systems, often incorporating touchscreens and touch panel displays as primary input systems. Touchscreens provide the functionality of traditional electronic devices and offer additional features, such as the ability to sketch, draw, and perform various handwriting applications when combined with appropriate software.

The development of flexible displays capable of being folded has enabled the creation of devices with larger display sizes without increasing the overall device size. Foldable displays offer several advantages, such as improved portability and the ability to transform a device into different form factors to suit various use cases.

Traditionally, foldable displays have used dedicated sensors, such as hall or gravity acceleration sensors, to detect the angle at which the flexible touchscreen is folded and determine whether the device is open or closed. These additional components can increase power consumption and device size, a critical concern for portable electronic devices with limited battery capacity.

SUMMARY

Technical advantages are generally achieved by embodiments of this disclosure, which describe detecting the folding state and angle of a foldable device.

A first aspect relates to a method for determining a folding angle of a foldable device. The foldable device comprising a touch controller, a display layer, and a touch-sensing layer, the foldable device being foldable along a folding axis, a first portion of the display layer in contact with a second portion of the display layer in a fully closed position of the foldable device. The method includes activating, by the touch controller, a mutual-capacitance sensing mechanism of the foldable device, wherein the activating comprises configuring one or more channels of the touch-sensing layer parallel to the folding axis on the first portion of the display layer as transmit channels, and configuring one or more channels of the touch-sensing layer parallel to the folding axis on the second portion of the display layer as receive channels; collecting, by the touch controller, mutual-capacitance raw data measurements; determining, by the touch controller, the folding angle based on the mutual-capacitance raw data measurements; and activating a function or an application based on the folding angle.

A second aspect relates to a foldable device. The foldable device includes a display layer have a first portion and a second portion, wherein the first portion is in contact with the second portion in a fully closed position of the foldable device, the foldable device being foldable along a folding axis; a touch-sensing layer disposed on an opposite surface of the first portion and the second portion of the display layer that is in contact with each other in the fully closed position, the touch-sensing layer comprising a plurality of drive lines and a plurality of sense lines arranged in a grid arrangement, the drive lines being orthogonal to the sense lines; a non-transitory memory storage comprising instructions; and a touch controller coupled to the touch-sensing layer and the non-transitory memory storage, the instructions, when executed by the touch controller, cause the foldable device to configure one or more drive lines or sense lines parallel to the folding axis on the first portion of the display layer as transmit channels, configure one or more drive lines or sense lines parallel to the folding axis on the second portion of the display layer as receive channels, collect mutual-capacitance raw data measurements, determine a folding angle of the foldable device based on the mutual-capacitance raw data measurements and, based thereon, activate a function or an application based on the folding angle.

A third aspect relates to a method for determining a folding angle of a foldable device, a first portion of a display layer of the foldable device being in contact with a second portion of the display layer in a fully closed position along a folding axis, the method comprising configuring one or more drive lines or sense lines of a touch-sensing layer parallel to the folding axis on the first portion of the display layer as transmit channels; configuring one or more drive lines or sense lines parallel to the folding axis on the second portion of the display layer as receive channels; collecting mutual-capacitance raw data measurements; and generating a filtered mutual-capacitance data set by performing a filtering operation on the mutual-capacitance raw data measurements; and determining the folding angle based on the filtered mutual-capacitance data set and, based thereon, activating a function or application based on the folding angle.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
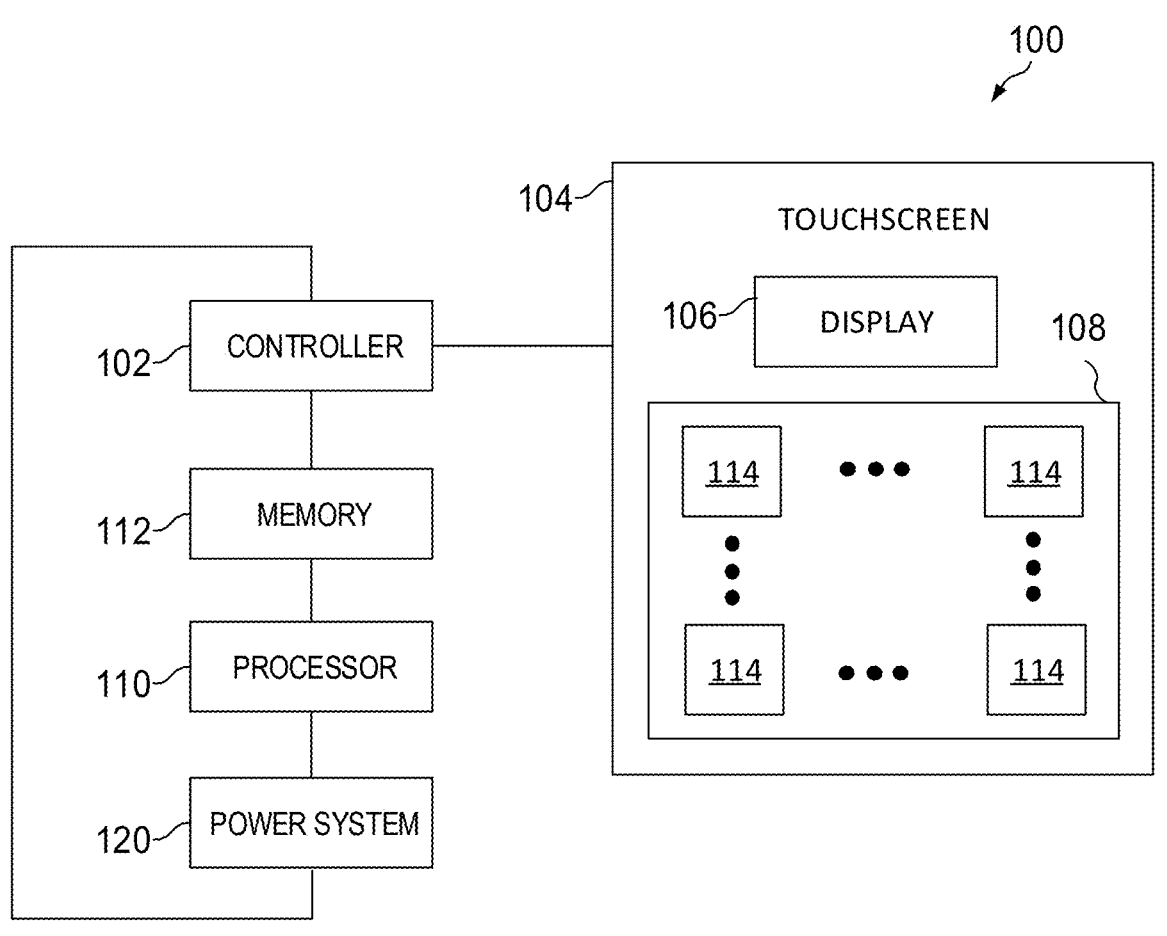
FIG. 1 is a block diagram of an embodiment foldable device.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a foldable smartphone, it should also be appreciated that these inventive aspects may also apply to other foldable devices, such as tablets, laptop computers, smartwatches, fitness trackers, and the like. In particular, aspects of this disclosure may apply to any foldable electronic device that utilizes a touchscreen interface that would benefit from detecting the state and angle of the folding device.

In embodiments, the fold angle of a foldable device is determined based on capacitive sensing. In embodiments, capacitive sensing utilizes mutual sensing techniques. In embodiments, capacitive sensing utilizes a combination of mutual and self-sensing techniques. Software applications and operating systems can utilize the folding angle information to trigger specific actions, adjust display configurations, or optimize performance based on the device's folding position. This can enable a more dynamic and personalized user experience that takes advantage of the unique folding capabilities of the device.

Currently, detecting the fold angle in foldable devices involves using multiple sensors. For instance, in some implementations, a dedicated acceleration and gravity (A+G) sensor is used exclusively for fold angle detection, while a separate Hall sensor is dedicated to open/close detection. The Hall sensor addresses accuracy issues associated with A+G sensors when the device is fully closed. However, this redundancy results in higher costs for the device. Additionally, including these dedicated sensors necessitates extra layout requirements and space, which poses a considerable challenge in, for example, flip phone designs where space is limited. Moreover, A+G sensors require a symmetric design, further complicating the layout process. The Hall sensor, which must be placed on the edge of the device, emits a magnetic field that can interfere with certain components, complicating its integration.

In embodiments, the touch controller (TC) integrated circuit (IC) of the foldable device is used to detect the folding angle of the device, replacing the need for the acceleration and gravity (A+G) sensor and the hall sensor. This approach offers several advantages. Firstly, it eliminates the need for two extra sensors, as the touch controller is already an existing component for finger touch detection on the screen of the foldable device. Utilizing the existing touch controller saves on the cost and space required for additional sensors. Secondly, the folding angle can be detected using mutual sensing techniques, an existing touch controller capability. This method allows for accurate detection of the folding angle without requiring dedicated sensors. Furthermore, self-sensing techniques can complement the mutual sensing techniques to increase the reliability detect the device's open/close state or its fold/unfold state. These and additional details are further detailed below.

FIG. 1 illustrates a block diagram of an embodiment foldable device 100. Foldable device 100 includes a touch controller 102, a touchscreen 104, a memory 112, a processor 110, and a power system 120, which may (or may not) be arranged as shown. Foldable device 100 may include additional components not depicted, such as long-term storage (e.g., non-volatile memory, etc.), additional input and output interfaces, speakers, or the like.

In embodiments, foldable device 100 is a smartphone, smartwatch, wearable device, tablet, laptop, gaming device, personal computer, or any other foldable device that includes a grid-type sensor, such as a device with a touch-screen.

In embodiments, touch controller 102 is arranged on a System-on-Chip (SoC). In embodiments, touch controller 102 may be implemented in any way known in the art. In embodiments, during normal operation, touch controller 102 controls the operation of touchscreen 104. For example, in some embodiments, touch controller 102 receives raw input data from the touchscreen 104 to determine, for example, the location and the type of touch.

Touch controller 102 may include an analog-to-digital converter (ADC)—not shown—to convert the analog signals from the touchscreen 104 to digital signals for further processing by touch controller 102. In embodiments, the ADC may be external to the touch controller 102. Touch controller 102 may be any component or collection of components adapted to perform computations or other processing-related tasks.

Processor 110 is configured to operate foldable device 100. In embodiments, processor 110 is implemented as a general-purpose or custom controller or processor coupled to memory 112 and configured to execute instructions from memory 112 or another memory of foldable device 100. In embodiments, processor 110 may be coupled to a second memory of foldable device 100, which stores the instructions to be executed by processor 110. In some embodiments, touch controller 102 is implemented as part of processor 110. In embodiments, processor 110 is a primary processing unit, and touch controller 102 is an auxiliary processing unit. In embodiments, the touch controller 102 and the processor 110 may be implemented as a single processing unit.

Memory 112 may be any component or collection of components adapted to store programming or instructions for execution by touch controller 102, the processor 110, or both. In an embodiment, memory 112 includes a non-transitory computer-readable medium. In some embodiments, memory 112 is part of processor 110. In some embodiments, memory 112 is external to processor 110, such as inside touch controller 102. Other implementations are also possible. In some embodiments, memory 112 may also be used for storing other types of data of foldable device 100.

In embodiments, touchscreen 104 allows users to interact and communicate with the foldable device 100. In embodiments, touchscreen 104 includes a display layer 106 and a touch-sensing layer 108.

The display layer 106 is configured to display images. In embodiments, a panel driver (not shown) may be coupled to the display layer 106 and the processor 110. The panel driver may be used to drive the display layer 106. The display layer 106 may comprise various technologies, such as a light-emitting diode (LED) display, an organic LED (OLED) display, a liquid crystal display (LCD), or an active-matrix organic LED (AMOLED) display.

The touch-sensing layer 108 can include an array of sensors arranged as a grid (e.g., a touch grid, touch cells, or sensing elements). For example, the touch-sensing layer 108 can include a plurality of sensors 114 arranged in rows and columns. Sensors 114 and the touch-sensing layer 108 may be implemented in any way known in the art. In embodiments, touchscreen 104 is a capacitive touchscreen.

The touch-sensing layer 108 can register user input via touches made to the surface of the display layer 106. Touch-sensing layer 108 may also be configured to detect input from other inputs, such as a stylus (active or passive) device. In embodiments, the touchscreen 104 may include sensors such as gyroscopes or accelerometers. One or more of these sensors may be integrated.

In embodiments, touchscreen 104 may be configured to receive image data to be displayed on the display layer 106 based on a folding angle θ of the foldable device 100. The folding angle θ may be detected by the touch controller 102 or processor 110. In various embodiments, touch controller 102 and touch-sensing layer 108 may be configured to operate based on mutual capacitance sensing techniques, self-capacitive sensing techniques, or a combination thereof, to detect the amount of change in the strength of mutual and self-capacitances and, based thereon, calculate and report the folding angle (θ).

Generally, touchscreen devices, such as foldable device 100, utilize two sensing methods to detect touch: mutual capacitive and self-capacitive. Mutual capacitive sensing, or mutual sensing data, refers to a touchscreen technology where touch detection is based on measuring the capacitance between two sensors, usually arranged in a grid of rows and columns. In this system, one sensor (the transmitter) emits a signal, and the corresponding change in capacitance is detected by the other sensor (the receiver). When a finger approaches or touches the display layer 106, it interferes with the electric field between the sensors of the touch-sensing layer 108, changing the mutual capacitance at that point, which is then detected by the system.

The primary advantage of mutual capacitive sensing is its ability to accurately detect and track multiple touch points, allowing advanced multi-touch functionalities. Due to its high resolution and precision in detecting touch inputs, which are used in modern touchscreens, it is suitable for applications requiring complex gestures and interactions.

Conversely, self-capacitive sensing, or self-sensing data, involves detecting touch based on the change in capacitance of individual sensors of the touch-sensing layer 108. In this method, the capacitance is measured between each sensor and the ground. When a finger is near or touching the display layer 106, it acts as a conductive object, altering the self-capacitance of the sensor in the touch-sensing layer 108, which the system recognizes as a touch.

Self-capacitance faces challenges in distinguishing between multiple simultaneous touches, while mutual capacitance is better suited for multi-touch detection, as each intersection of a row and column can be measured independently. However, self-capacitance excels in applications where simple touch interactions are sufficient and cost-effectiveness is a priority. Further, self-capacitance is generally more sensitive to conductive objects and can detect proximity from a greater distance, but it may be more susceptible to noise and interference. While less sensitive than self-capacitance, mutual capacitance is generally more precise and less prone to noise and interference.

Power system 120 provides a power source for the operation and portability of foldable device 100. Power system 120 may be a power management integrated circuit (PMIC). Power system 120 may include a controller, a battery, a charging circuit, an interface, and other components to allow inductive charging by transferring power from a charging pad or a base station to foldable device 100. The power system 120 may be any component or collection of components that manage and control power distribution, conversion, and regulation in foldable device 100. In various embodiments, power system 120 is configured to regulate supply voltage to various components of foldable device 100 and control the charging, discharging, and monitoring of the operations of a battery.

Figure 2A:
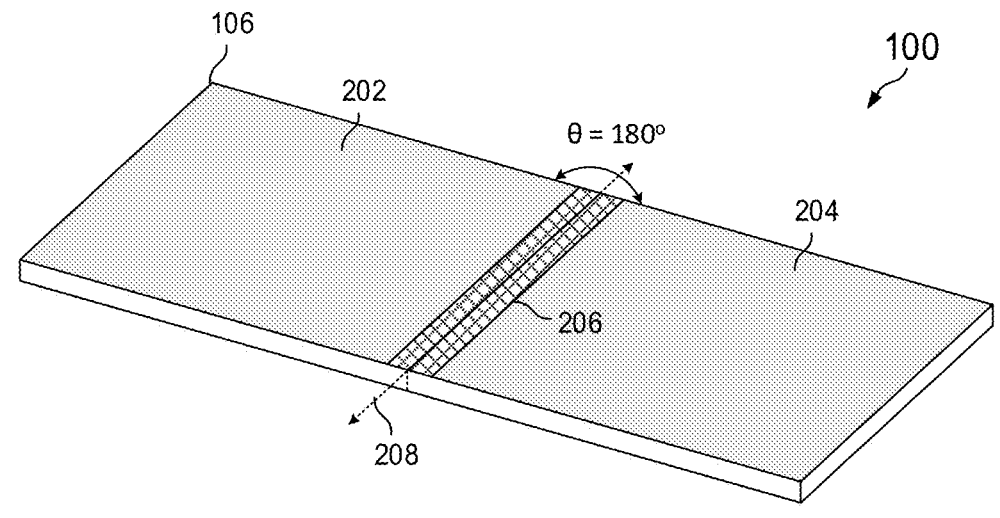
FIG. 2A is a planar view of the foldable device in a fully open position.
Figure 2B:
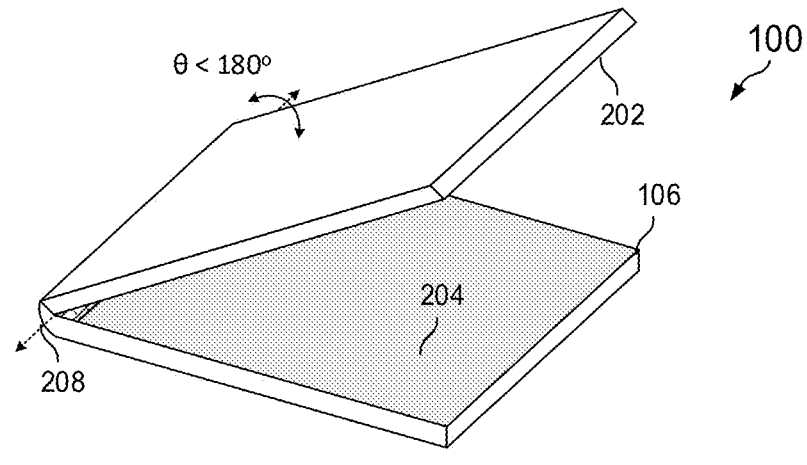
FIG. 2B is a planar view of the foldable device in a partially open position.
Figure 2C:
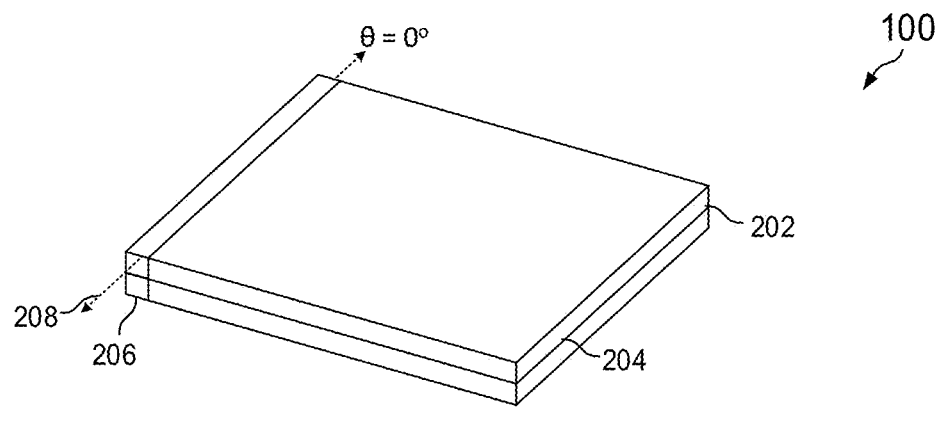
FIG. 2C is a planar view of the foldable device in a fully closed position.

FIGS. 2A-C illustrate planar views of the foldable device 100 in various folding configurations. In embodiments, the display layer 106 includes a first portion 202 and a second portion 204, which can be mechanically coupled via a folding structure 206, such as a hinge along the folding axis 208 of the foldable device 100. In FIGS. 2A-C, the foldable device 100 is oriented such that it is configured to be rotated across its width (i.e., flip mode) or length (i.e., fold mode).

The folding structure 206 may be any mechanical structure that allows the first portion 202 to be rotated with respect to the second portion 204 (or vice versa). In embodiments, the display layer 106 is a foldable display layer and the folding structure 206 is arranged beneath the display layer 106 as a folding mechanism of the foldable device 100.

In embodiments, the first portion 202 and the second portion 204 may be separate displays that allow the foldable device 100 to have a folding configuration by rotating them along the folding axis 208 through the foldable device 100. In embodiments, display layer 106 is a single flexible display with a first portion 202 and a second portion 204.

The foldable device 100 may be configured to be folded or unfolded by rotating the first portion 202 towards or away from the second portion 204 along the folding axis 208 using the folding structure 206. A first portion of the folding structure 206 may be on the first portion 202, while a second portion of the folding structure 206 may be on the second portion 204.

The folding angle (θ) can be defined as an angle between the first portion 202 and the second portion 204 along the folding axis 208. The folding axis 208 may allow various degrees of rotation between the first portion 202 and the second portion 204. In various embodiments, the foldable device 100 may be configured to be rotated between any angle between a completely unfolded position shown in FIG. 2A to a completely folded position in FIG. 2C. In other words, the folding angle (θ) may range from 180° (e.g., the open position) to 0° (e.g., the closed position). Alternatively, the folding angle (θ) may range from 0° (e.g., the closed position) to 360° (e.g., the open but fully rotated position).

FIG. 2A illustrates a planar view of the foldable device 100 in a fully open position. In this configuration, the folding angle (θ) equals 180°. In the fully open position, the first portion 202 is on the same two-dimensional plane as the second portion 204 along the folding axis 208.

FIG. 2B illustrates a planar view of the foldable device 100 in a partially open position. In this configuration, the folding angle (θ) is less than 180° but greater than 0°. In the partially open position, the first portion 202 is no longer on the same plane as the second portion 204.

FIG. 2C illustrates a planar view of the foldable device in a fully closed position. In this configuration, the folding angle (θ) equals 0°. In the fully closed position, the first portion 202 is fully facing the second portion 204.

In embodiments, capacitive sensing data is collected to determine the folding angle (θ) in the various folding configurations of the foldable device 100. Advantageously, the folding angle (θ) is determined without adding sensors and using existing components within the foldable device 100.

Figure 3:
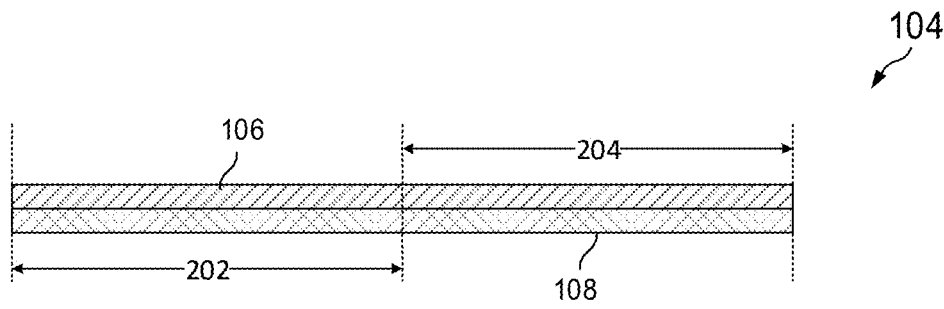
FIG. 3 is a side view of a touchscreen.

FIG. 3 illustrates a side view of touchscreen 104. Touchscreen 104 includes the display layer 106 and the touch-sensing layer 108. The arrangement and composition of the display layer 106 and the touch-sensing layer 108 may vary depending on the specific device design and the chosen display and touch-sensing technologies.

In embodiments, the touch-sensing layer 108 and the display layer 106 are situated on the front-facing side, with the display layer 106 positioned above the touch-sensing layer 108. This arrangement makes the display visible to the user while enabling touch input functionality through the underlying touch-sensing layer 108.

As shown, display layer 106 is a single flexible display with a first portion 202 and a second portion 204. However, it should be appreciated that in some embodiments, display layer 106 can include two distinct displays mechanically attached through the folding structure 206. For example, the first portion 202 is a first display and the second portion 204 is a second display.

The touch-sensing layer 108 can consist of a transparent conductive material, such as indium tin oxide (ITO), deposited on a substrate like glass or plastic. The conductive layer can be patterned into a grid of sensors 114 that can detect changes in electrical properties when touched by a user's finger or a stylus. In embodiments, the touch-sensing layer 108 is coupled to touch controller 102, which processes the touch input signals and communicates them to the processor 110.

Above the touch-sensing layer 108, the display layer 106 is configured to generate visual output. Depending on the specific display technology used, the display layer 106 may include additional components such as a backlight unit, polarizers, color filters, and thin-film transistors (TFTs). These components work together to create visible images and text on the screen.

An additional protective layer, such as a clear glass or plastic cover, may be placed above the display layer 106 to shield it from scratches and other damage. This protective layer provides a smooth surface for the user's fingers to glide across during touch input.

Figure 4:
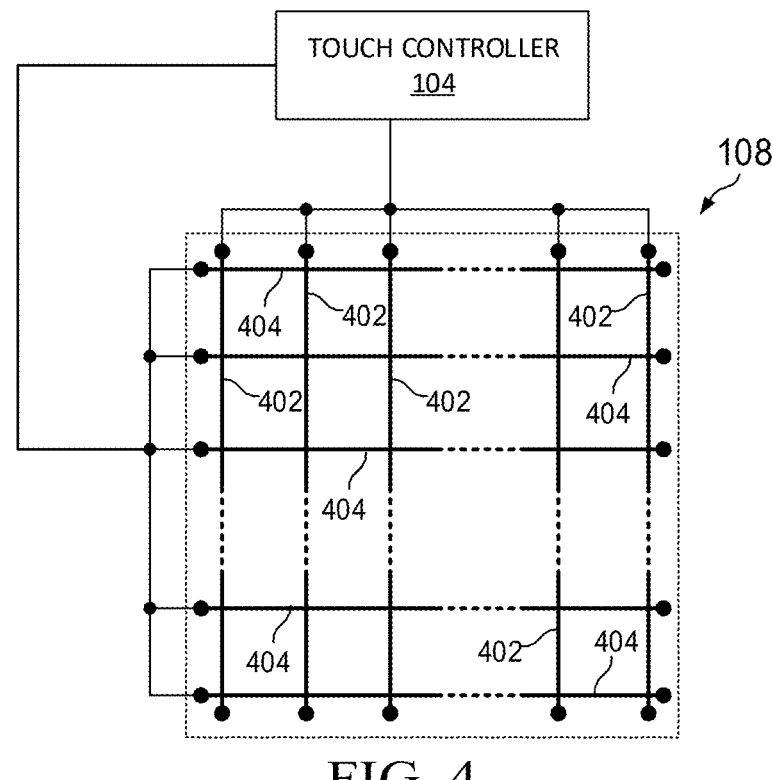
FIG. 4 is a simplified diagram of the touch-sensing layer.

FIG. 4 illustrates a simplified diagram of the touch-sensing layer 108. As shown, the sensors 114 of the touch-sensing layer 108 are arranged in a grid arrangement. The touch-sensing layer 108 includes a plurality of drive lines 402 and a plurality of sense lines 404. In embodiments, the drive lines 402 and the sense lines 404 span across the touch-sensing layer 108 underneath the display layer 106.

The touch controller 102 is coupled to the drive lines 402 and the sense lines 404. In embodiments, the drive lines 402 are arranged in columns, and the sense lines 404 are arranged in rows across the touch-sensing layer 108, or vice versa. The number of drive lines 402 and sense lines 404 is non-limiting. In embodiments, the drive lines 402 and sense lines 404 can overlap. For example, drive lines 402 and sense lines 404 can overlap (cross-bar pattern), interleave, or be arranged at various angles, such as in a diamond pattern.

Drive lines 402 and sense lines 404 intersect to form a matrix of mutual capacitors, each with a measurable mutual capacitance at the point of intersection. Mutual capacitance refers to the electrical capacitance between two conductors, in this case, a drive line and a sense line. When a touch event occurs, such as a finger or stylus touching the display layer 106, it alters the mutual capacitance at the corresponding intersection, allowing the touch location to be detected.

For example, in a cross-bar pattern, a mutual capacitance is formed at each junction between the sense line below it and the drive line above it—or vice versa depending on the arrangement of the drive lines 402 and the sense lines 404. The mutual capacitance is measured when the drive line is energized.

In addition to mutual capacitance, each drive line and sense line can exhibit a measurable self-capacitance. Self-capacitance is the electrical capacitance between a single conductor and ground. In embodiments, the self-capacitance is the capacitance from the drive lines 402 to the ground. In the touch-sensing layer 108, the self-capacitance of a drive line or sense line can be measured independently of other lines. This means the touch-sensing layer 108 can operate in mutual sensing and self-sensing modes.

In mutual sensing mode, the touch controller 102 can measure the change in mutual capacitance at each intersection of drive lines 402 and sense lines 404 to determine the location of a touch event. This mode is commonly used in multi-touch applications, as it allows for detecting multiple simultaneous touch points.

On the other hand, in self-sensing mode, the touch controller 102 can measure the change in self-capacitance of individual drive lines or sense lines. When a touch event occurs, it alters the self-capacitance of the corresponding line, enabling the detection of touch location. Self-sensing mode is often used in single-touch applications or as complementary to mutual sensing mode.

Figure 5:
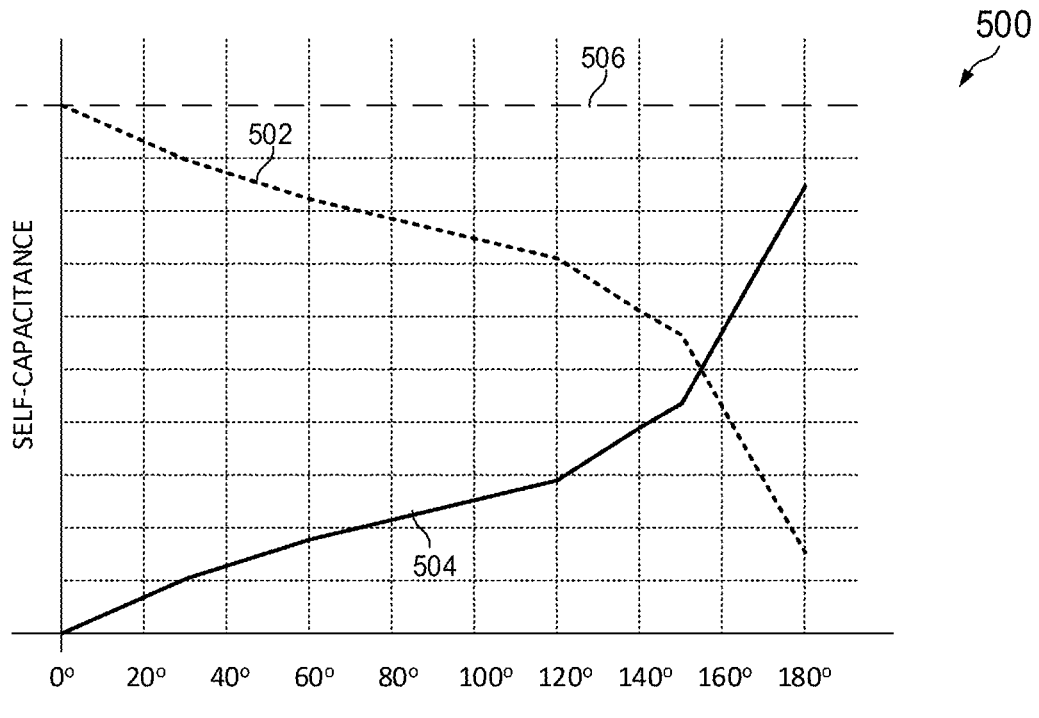
FIG. 5 is a chart of self-capacitance data collected by the touch controller from the touch-sensing layer at various folding angles of the foldable device.

FIG. 5 illustrates a chart 500 of self-capacitance data collected by the touch controller 102 from the touch-sensing layer 108 at various folding angles of the foldable device 100. Chart 500 includes a first plot 502 and a second plot 504. The first plot 502 corresponds to the self-capacitance raw data. The second plot 504 corresponds to the self-capacitance filtered data.

The second plot 504 is generated from the self-capacitance raw data of the first plot 502. To arrive at it, the self-capacitance raw data of the first plot 502 are subtracted from the baseline (0° raw data) 506 at each folding angle (θ). Accordingly, the second plot 504 provides a filtered (i.e., normalized) data set.

When the foldable device 100 is in the fully closed position, as shown in FIG. 2C, the folding angle (θ) equals 0°. The self-capacitance raw data value is at its largest in this configuration. The baseline 506 corresponds to the self-capacitance value in this configuration. Accordingly, the self-capacitance filtered value at 0° equals zero. The self-capacitance raw data value is at its smallest in this configuration. The self-capacitance raw data value decreases from the fully closed to the fully open position. When the foldable device 100 is fully open, as shown in FIG. 2A, the folding angle (θ) equals 180°.

Accordingly, the self-capacitance raw data varies depending on the different folding angles. As the folding angle changes, the self-capacitance values undergo corresponding alterations. This relationship between the self-capacitance and the folding angle allows for calculating the folding angle based on the observed changes in the self-capacitance data.

By monitoring and analyzing the variations in the self-capacitance raw data, it becomes possible to determine the precise folding angle of the device at any given moment. Utilizing the changing self-capacitance to calculate the folding angle offers a non-invasive and efficient method for monitoring the device's folding behavior.

In embodiments, the normalized data set is set as a function ƒ(θ), which exhibits the properties of a monotonic function. Consequently, the normalized data set can serve as an indication of the folding angle. To effectively map this reflection, a look-up table approach can be employed. The lookup table can store predefined values corresponding to specific folding angles, which can serve as reference points for determining the folding angle based on the normalized self-capacitance value.

In cases where the normalized self-capacitance value falls between the values in the look-up table, linear fitting can be utilized to interpolate and generate the corresponding folding angle (θ). This interpolation method ensures a smooth and continuous representation of the folding angle (θ), even when the exact value is not explicitly defined in the look-up table. The look-up table can be stored in memory 112.

Figure 6:
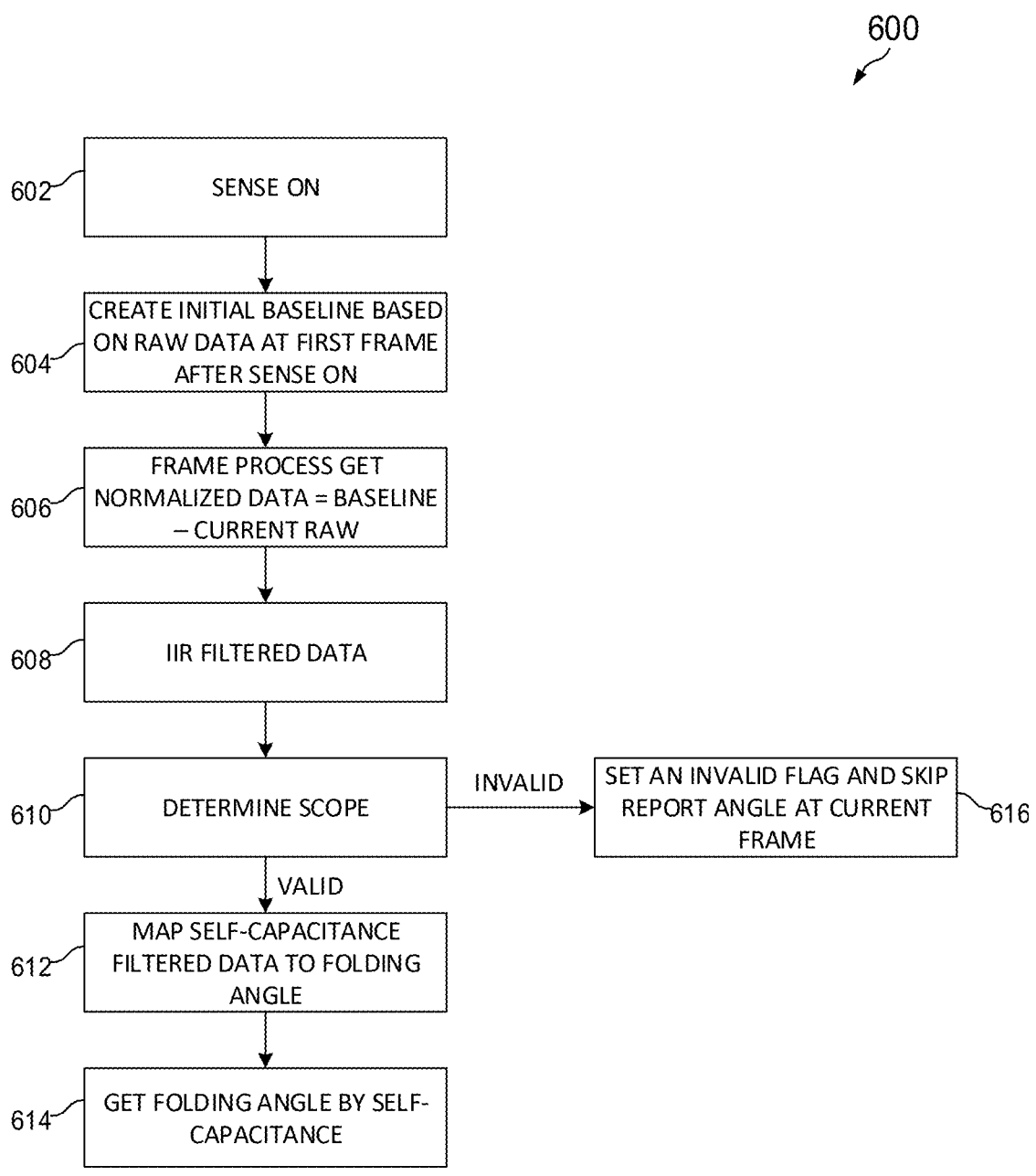
FIG. 6 is a flow chart of an embodiment method for determining the folding angle ($\theta$) of the foldable device using self-capacitance sensing.

FIG. 6 illustrates a flow chart of an embodiment method 600 for determining the folding angle (θ) of the foldable device 100 using self-capacitance sensing. It is noted that all steps outlined in the flow chart of the method are not necessarily required and can be optional. Further, changes to the arrangement of the steps, removal of one or more steps and path connections, and addition of steps and path connections are similarly contemplated.

In embodiments, method 600 involves establishing a baseline, filtering the data, mapping the filtered data to the folding angle (θ) using a lookup table or function, and reporting the folding angle (θ) if it falls within the valid scope. The system continuously updates the folding angle (θ) measurements for each frame, allowing for real-time tracking of the device's folding state.

At step 602, the sensing mechanism is activated. At step 604, after the sensing mechanism is turned on, touch controller 102 creates an initial baseline based on the self-capacitance raw data measurements obtained at the first frame. This baseline serves as a reference point for subsequent measurements. In embodiments, the baseline corresponds to self-capacitance raw data measurements of the foldable device 100 in the fully closed position.

At step 606, touch controller 102 performs frame processing to get the normalized self-capacitance data for the present frame. The normalized self-capacitance data is calculated by subtracting the current self-capacitance raw data from the baseline established in step 604.

In embodiments, at step 608, touch controller 102 performs a filtering step on the normalized self-capacitance data using, for example, Infinite Impulse Response (IIR) filtering to smooth out any noise or fluctuations.

At step 610, touch controller 102 determines the scope of the folding angle (θ). In embodiments, touch controller 102 verifies whether the filtered self-capacitance data for the current frame falls within the valid range for mapping to a folding angle (θ).

If the filtered self-capacitance data is within the valid scope, at step 612, touch controller 102 maps the filtered self-capacitance data to the corresponding folding angle (θ). This mapping can be done using a predefined lookup table or a mathematical function that relates the filtered self-capacitance data to the folding angle (θ). If the filtered self-capacitance data is outside the valid scope, at step 616, touch controller 102 sets an invalid flag and skips reporting the folding angle (θ) for the current frame. This ensures that only valid and reliable folding angle measurements are reported.

At step 614, after mapping the filtered self-capacitance data to the folding angle (θ), touch controller 102 obtains the folding angle and reports the value to the processor 110. The process can be repeated continuously to determine the folding angle (θ) at subsequent frames.

Figure 7:
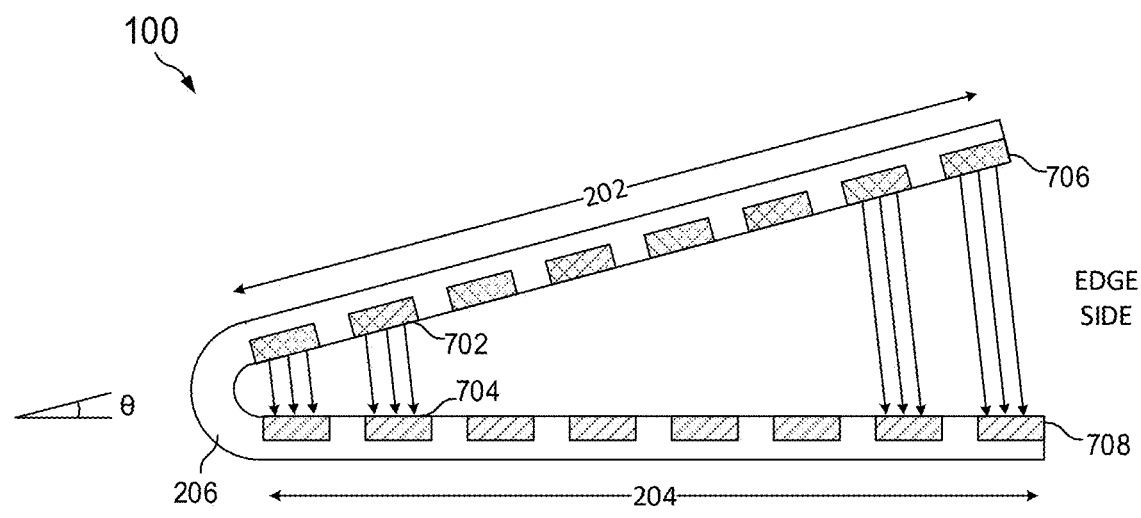
FIG. 7 is a side view of the foldable device to detect the folding angle ($\theta$) using mutual-capacitance techniques.

FIG. 7 illustrates a side view of the foldable device 100 to detect the folding angle (θ) using mutual-capacitance techniques. It is possible to configure the sense lines 404 as drive lines 402 through a technique known as "TX-RX swapping" or "TX-RX multiplexing." This approach differs from the traditional mutual capacitance sensing arrangement, where drive lines 402 are dedicated to transmitting the stimulation signal and sense lines 404 are dedicated to receiving the resulting signals.

Generally, in mutual capacitance sensing, the drive lines 402 are sequentially stimulated one at a time, while the sense lines 404 channels are simultaneously sensed. This allows for the measurement of the mutual capacitance at each intersection point. When a touch event occurs, it alters the mutual capacitance between the drive line and sense lines at the corresponding intersection. The sense channel detects this change in capacitance, and the touch controller 102 processes the received signals to determine the location and characteristics of the touch event.

In embodiments where the sense lines 404 are parallel with the folding axis 208 of the foldable device 100 (i.e., the foldable device 100 folds along a line parallel with the sense lines 404), a first subset of the sense lines 404 nearest to the folding structure 206 of the first portion 202 are configured as transmit channels 702, which are stimulated. Simultaneously, a second subset of the sense lines 404 nearest to the folding structure 206 of the second portion 204 is configured as receive channels 704, which are sensed to measure the mutual capacitance at the folding structure 206 of the foldable device 100. In embodiments, the subsets include a single line. In embodiments, the sense lines 404 configured as transmit or receive channels are a subset of sense lines 404 nearest to the folding structure 206 and parallel with the folding axis 208 of the foldable device 100.

In embodiments where the drive lines 402 are parallel with the folding axis 208 of the foldable device 100 (i.e., the foldable device 100 folds along a line parallel with the sense lines 404), the process is reversed. A first subset of the drive lines 402 nearest to the folding structure 206 of the first portion 202 are configured as transmit channels 702, which are stimulated. Simultaneously, a second subset of the drive lines 402 nearest to the folding structure 206 of the second portion 204 are configured as receive channels 704, which are sensed to measure the mutual capacitance at the folding structure 206 of the foldable device 100. In embodiments, the subsets include a single line. In embodiments, the drive lines 402 configured as transmit or receive channels are a subset of drive lines 402 nearest to the folding structure 206 and parallel with the folding axis 208 of the foldable device 100.

In embodiments where the sense lines 404 are parallel with the folding axis 208 of the foldable device, a first subset of the sense lines 404 furthest from the folding structure 206 (nearest to the edge of the foldable device 100) of the first portion 202 are configured as transmit channels 706, which are stimulated. Simultaneously, a second subset of the sense lines 404 furthest from the folding structure 206 (nearest to the edge of the foldable device 100) of the second portion 204 is configured as receive channels 708, which are sensed to measure the mutual capacitance at the device edge. In embodiments, the subsets include a single line. In embodiments, the sense lines 404 configured as transmit or receive channels are a subset of sense lines 404 nearest to the device edge and parallel with the folding axis 208 of the foldable device 100.

In embodiments where the drive lines 402 are parallel with the folding axis 208 of the foldable device, a first subset of the drive lines 402 furthest from the folding structure 206 (nearest to the edge of the foldable device 100) of the first portion 202 are configured as transmit channels 706, which are stimulated. Simultaneously, a second subset of the drive line 402 furthest from the folding structure 206 (nearest to the edge of the foldable device 100) of the second portion 204 is configured as receive channels 708, which are sensed to measure the mutual capacitance at the device edge. In embodiments, the subsets include a single line. In embodiments, the drive lines 402 configured as transmit or receive channels are a subset of drive lines 402 furthest from the folding structure 206 and parallel with the folding axis 208 of the foldable device 100.

Touch controller 102 (or touch-sensing layer 108) can include configurable lines that can be dynamically assigned as drive lines 402 or sense lines 404 to configure the sense lines 404 as transmit channels or drive lines 402 as receive channels (i.e., to enable TX-RX swapping), For example, each line can be coupled to a multiplexer or a switch, allowing for flexible role assignments. During the sensing process, the touch controller 102 can dynamically configure a subset of lines as transmit channels 702 or 706 on the first portion 202, while the remaining lines on the second portion 204 can be configured as receive channels 704 or 708, or vice versa. In embodiments, the process can be repeated for the channels of the second portion 204 to improve accuracy.

Figure 8:
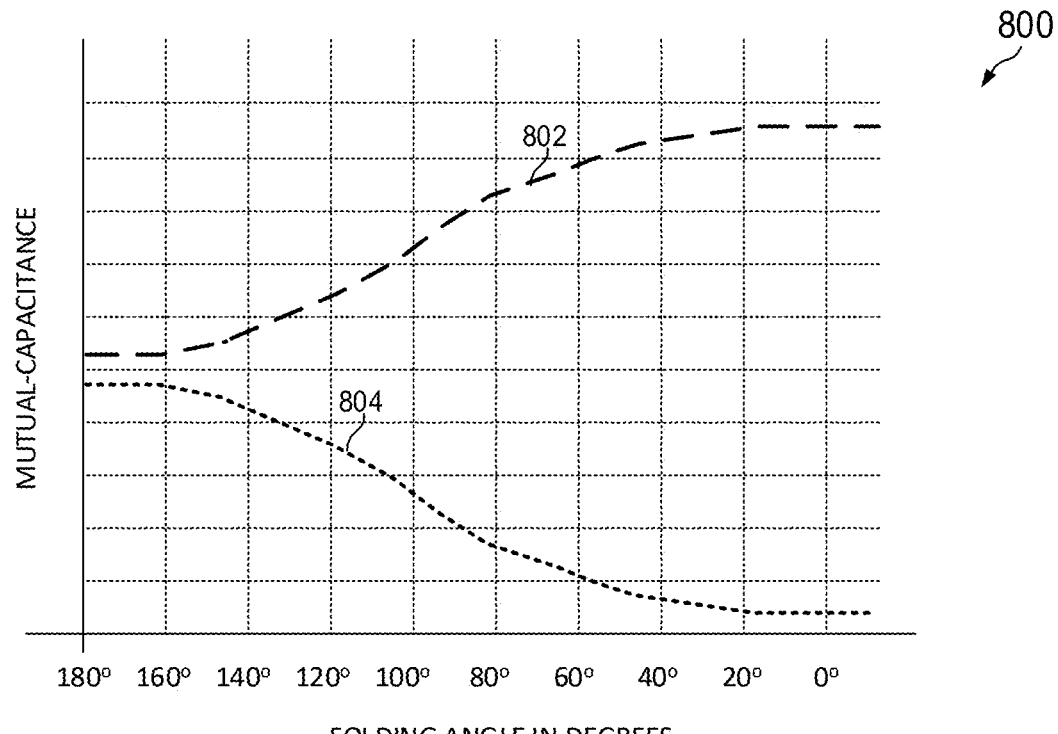
FIGS. 8 and 9 are examples of the mutual capacitance measurements for sense lines near the folding structure and sense lines near the device edge, respectively.
Figure 9:
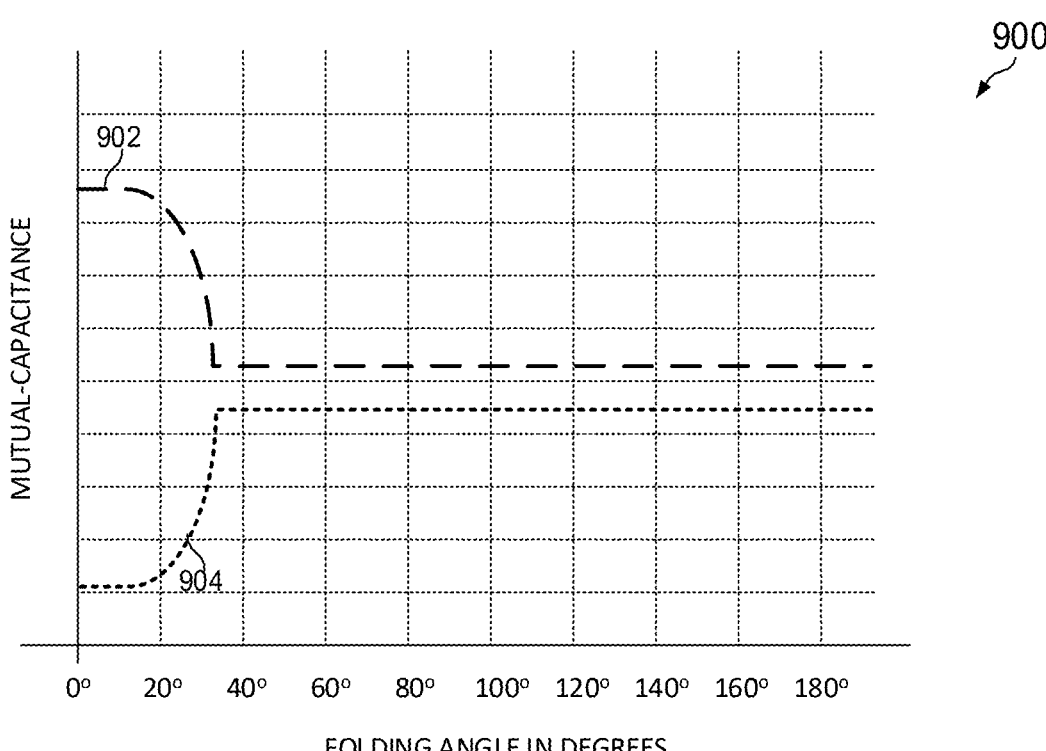

FIGS. 8 and 9 illustrate examples of the mutual capacitance measurements for sense lines 404 near the folding structure 206 and sense lines 404 near the device edge, respectively. The distinction in sensitivity between the channels near the folding structure 206 of the foldable device 100 and channels near the device edge can be used to detect different aspects of the device's folding behavior.

As shown in FIG. 8, the channels 802 and 804 near the folding structure 206, provide a wide range of sensitivity to changes in the folding angle (θ) (i.e., from about 20° to 180°). These channels 802 and 804 can detect and respond to varying degrees of folding, allowing for accurate tracking of the folding state within this angular range.

By monitoring channels 802 and 804 near the folding structure 206, the continuous tracking of the folding angle (θ) is made possible, providing information about the precise folding position across a wide angular range.

In embodiments, the mutual capacitance at the folding structure 206 of the foldable device 100 is used to detect the folding angle (θ) of the foldable device 100 when the device is not in the closed position (i.e., where the folding angle (θ)

is greater 0°), which includes detecting the folding angle (θ) of the foldable device 100 when the device is fully open (i.e., when the folding angle (θ) equals 180°).

As shown in FIG. 9, the edge area channels 902 and 904 are better optimized for accurately detecting the fully closed state (i.e., 0°). The channels positioned at the edge area of the foldable device 100 demonstrate a different sensitivity profile. These channels are highly sensitive, specifically to the fully closed state of the foldable device 100. When the foldable device 100 approaches or reaches the fully closed position, the edge area channels can detect and signal this specific state effectively.

Edge area channels 902 and 904 are reliable indicators of the fully closed state, ensuring accurate detection of when the device is completely folded shut. By leveraging the different sensitivity characteristics of the channels, touch controller 102 can effectively monitor and respond to the gradual changes in the folding angle (θ) and the specific fully closed state.

In embodiments, the mutual capacitance at the device edge of the foldable device 100 is used to detect the folding angle (θ) of the foldable device 100 when the device is fully closed (i.e., where the folding angle (θ) equals 0°).

In embodiments, the mutual-capacitance raw data of channels 802, 804, 902, and 904 are subtracted from a baseline (0° raw data) to generate a normalized data set. In embodiments, the normalized data set is set as a function $f(\theta)$, which exhibits the properties of a monotonic function. Consequently, the normalized data set can serve as an indication of the folding angle. A look-up table approach can be employed to map this reflection. The lookup table can store predefined values corresponding to specific folding angles, which can serve as reference points for determining the folding angle based on the normalized mutual-capacitance value.

In cases where the normalized mutual-capacitance value falls between the values in the look-up table, linear fitting can be utilized to interpolate and generate the corresponding folding angle (θ). This interpolation method ensures a smooth and continuous representation of the folding angle (θ), even when the exact value is not explicitly defined in the look-up table. The look-up table can be stored in memory 112.

Figure 10:
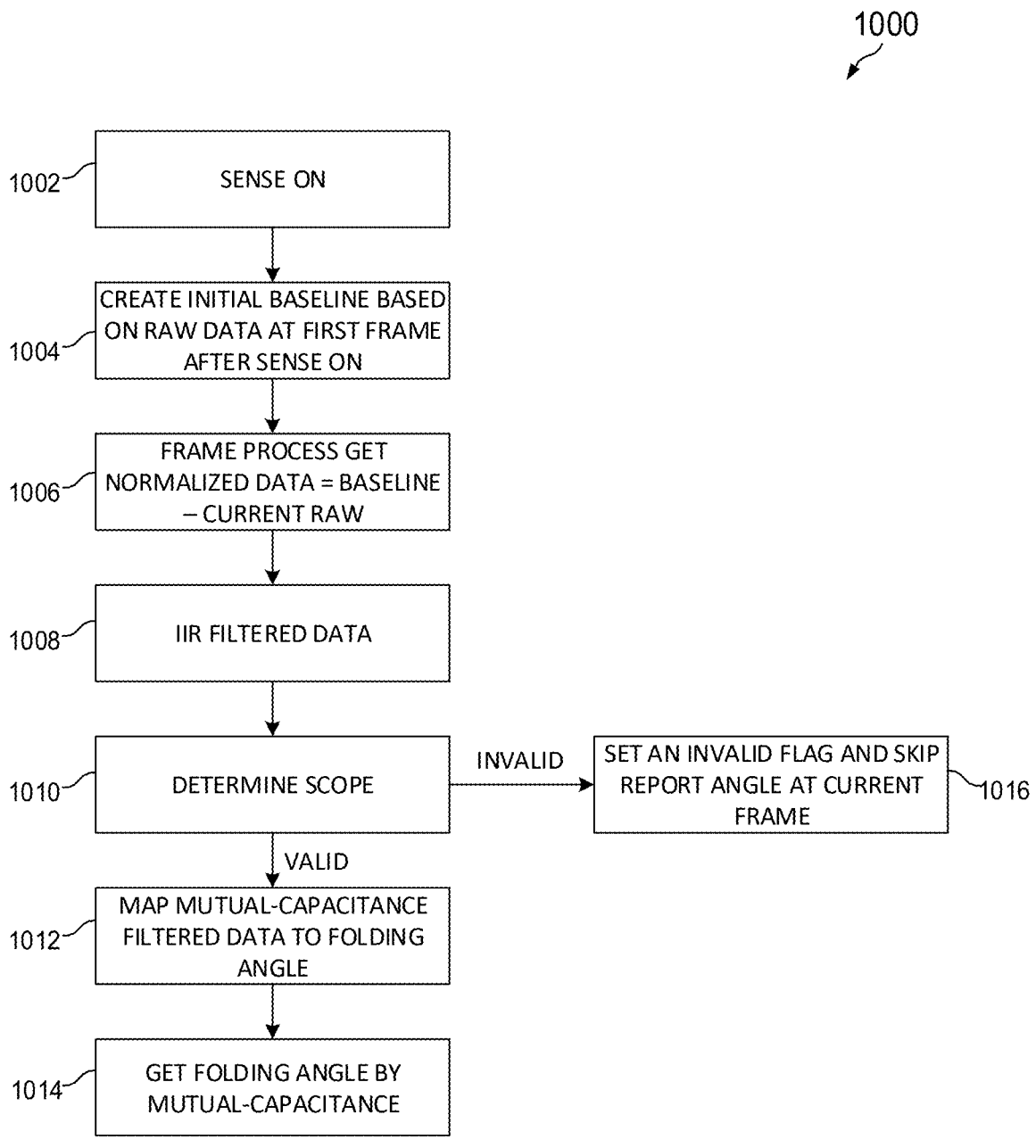
FIG. 10 is a flow chart of an embodiment method for determining the folding angle (θ) of the foldable device using mutual-capacitance sensing.

FIG. 10 illustrates a flow chart of an embodiment method 1000 for determining the folding angle (θ) of the foldable device 100 using mutual-capacitance sensing. It is noted that all steps outlined in the flow chart of the method are not necessarily required and can be optional. Further, changes to the arrangement of the steps, removal of one or more steps and path connections, and addition of steps and path connections are similarly contemplated.

In embodiments, method 1000 involves establishing a baseline, filtering the data, mapping the filtered data to the folding angle (θ) using a lookup table or function, and reporting the folding angle (θ) if it falls within the valid scope. The system continuously updates the folding angle (θ) measurements for each frame, allowing for real-time tracking of the device's folding state.

At step 1002, the mutual-capacitance sensing mechanism is activated. The activation step may include configuring sense channels nearest the folding structure 206, near the edge of the device, or both, on one portion of the foldable device 100 as drive lines 402, while simultaneously keeping the channels on the other portion of the foldable device 100 as sense lines 404. In embodiments, the selection of channels is based on which of the drive lines 402 or sense lines 404 are parallel to the folding axis 208.

In embodiments where the sense lines 404 are parallel with the folding axis 208 of the foldable device 100 (i.e., the foldable device 100 folds along a line parallel with the sense lines 404), a first subset of the sense lines 404 nearest to the folding structure 206 of the first portion 202 are configured as transmit channels 702, which are stimulated. Simultaneously, a second subset of the sense lines 404 nearest to the folding structure 206 of the second portion 204 is configured as receive channels 704, which are sensed to measure the mutual capacitance at the folding structure 206 of the foldable device 100. In embodiments, the subsets include a single line. In embodiments, the sense lines 404 configured as transmit or receive channels are a subset of sense lines 404 nearest to the folding structure 206 and parallel with the folding axis 208 of the foldable device 100.

In embodiments where the drive lines 402 are parallel with the folding axis 208 of the foldable device 100 (i.e., the foldable device 100 folds along a line parallel with the sense lines 404), the process is reversed. A first subset of the drive lines 402 nearest to the folding structure 206 of the first portion 202 are configured as transmit channels 702, which are stimulated. Simultaneously, a second subset of the drive lines 402 nearest to the folding structure 206 of the second portion 204 are configured as receive channels 704, which are sensed to measure the mutual capacitance at the folding structure 206 of the foldable device 100. In embodiments, the subsets include a single line. In embodiments, the drive lines 402 configured as transmit or receive channels are a subset of drive lines 402 nearest to the folding structure 206 and parallel with the folding axis 208 of the foldable device 100.

In embodiments where the sense lines 404 are parallel with the folding axis 208 of the foldable device, a first subset of the sense lines 404 furthest from the folding structure 206 (nearest to the edge of the foldable device 100) of the first portion 202 are configured as transmit channels 706, which are stimulated. Simultaneously, a second subset of the sense lines 404 furthest from the folding structure 206 (nearest to the edge of the foldable device 100) of the second portion 204 is configured as receive channels 708, which are sensed to measure the mutual capacitance at the device edge. In embodiments, the subsets include a single line. In embodiments, the sense lines 404 configured as transmit or receive channels are a subset of sense lines 404 nearest to the device edge and parallel with the folding axis 208 of the foldable device 100.

In embodiments where the drive lines 402 are parallel with the folding axis 208 of the foldable device, a first subset of the drive lines 402 furthest from the folding structure 206 (nearest to the edge of the foldable device 100) of the first portion 202 are configured as transmit channels 706, which are stimulated. Simultaneously, a second subset of the drive line 402 furthest from the folding structure 206 (nearest to the edge of the foldable device 100) of the second portion 204 is configured as receive channels 708, which are sensed to measure the mutual capacitance at the device edge. In embodiments, the subsets include a single line. In embodiments, the drive lines 402 configured as transmit or receive channels are a subset of drive lines 402 furthest from the folding structure 206 and parallel with the folding axis 208 of the foldable device 100.

At step 1004, after the sensing mechanism is turned on, touch controller 102 creates an initial baseline based on the mutual-capacitance raw data measurements obtained at the first frame. This baseline serves as a reference point for subsequent measurements. In embodiments, the baseline corresponds to mutual-capacitance raw data measurements of the foldable device 100 in the fully closed position for monitoring the subset of channels.

At step 1006, touch controller 102 performs frame processing to get the normalized mutual-capacitance data for the present frame. The normalized mutual-capacitance data is calculated by subtracting the current mutual-capacitance raw data from the baseline established in step 1004.

In embodiments, at step 1008, touch controller 102 performs a filtering step on the normalized mutual-capacitance data using, for example, Infinite Impulse Response (IIR) filtering to smooth out any noise or fluctuations.

At step 1010, touch controller 102 determines the scope of the folding angle (θ). In embodiments, touch controller 102 verifies whether the filtered mutual-capacitance data for the current frame falls within the valid range for mapping to a folding angle (θ).

If the filtered mutual-capacitance data is within the valid scope, at step 1012, touch controller 102 maps the filtered mutual-capacitance data to the corresponding folding angle (θ). This mapping can be done using a predefined lookup table or a mathematical function that relates the filtered mutual-capacitance data to the folding angle (θ). If the filtered mutual-capacitance data is outside the valid scope, at step 1016, touch controller 102 sets an invalid flag and skips reporting the folding angle (θ) for the current frame. This ensures that only valid and reliable folding angle measurements are reported.

At step 1014, after mapping the filtered mutual-capacitance data to the folding angle (θ), touch controller 102 obtains the folding angle and reports the value to the processor 110. The process can be repeated continuously to determine the folding angle (θ) at subsequent frames. Software applications and operating systems can utilize folding angle information to trigger specific actions, adjust display configurations, or optimize performance based on the device's folding position. This can enable a more dynamic and personalized user experience that takes advantage of the unique folding capabilities of the device.

Figure 11:
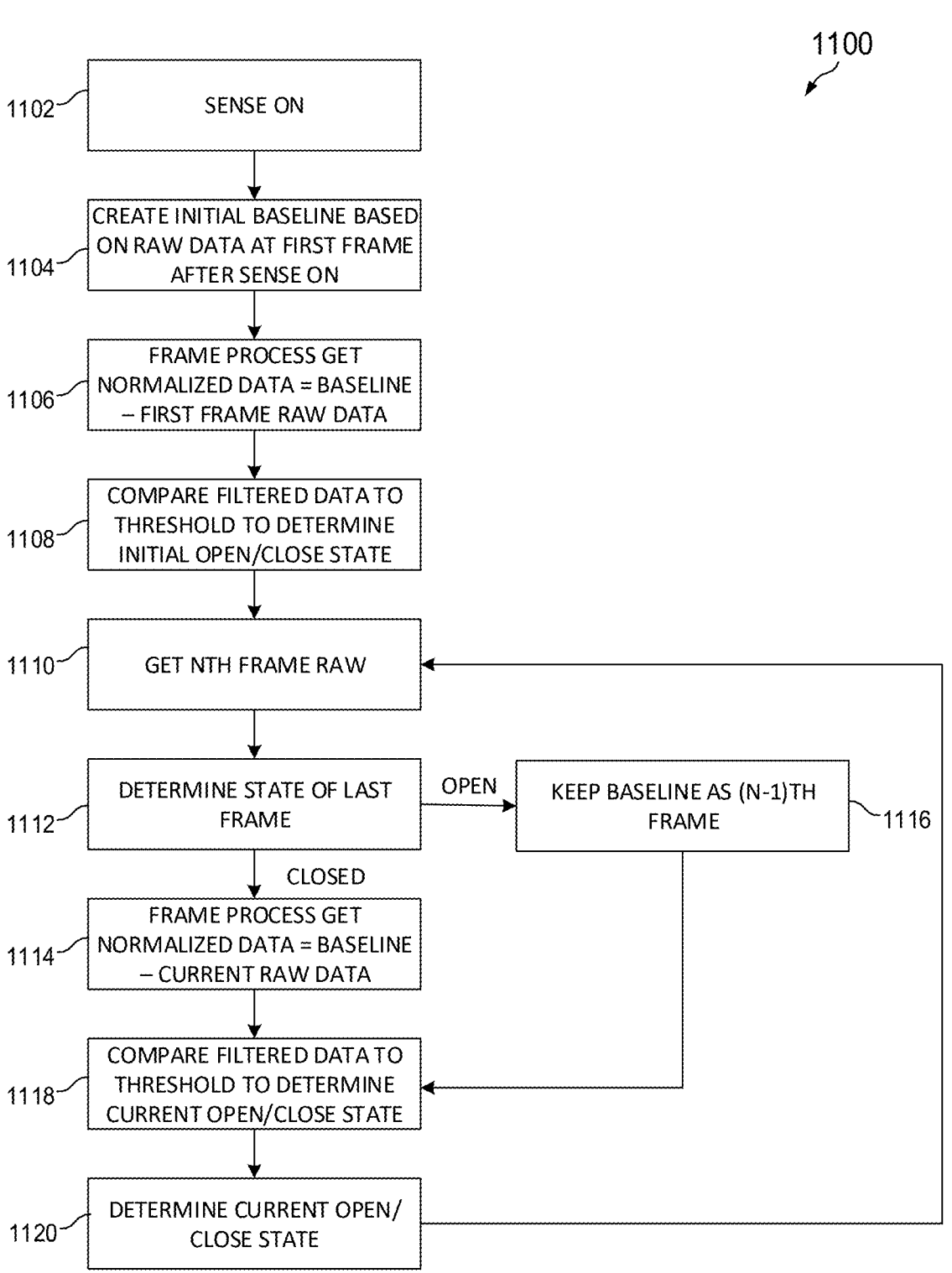
FIG. 11 is a flow chart of an embodiment method for detecting the open and closed state of a foldable device using mutual sensing techniques.

FIG. 11 illustrates a flow chart of an embodiment method 1100 for detecting the open and closed state of a foldable device 100 using mutual sensing techniques. It is noted that all steps outlined in the flow chart of the method are not necessarily required and can be optional. Further, changes to the arrangement of the steps, removal of one or more steps and path connections, and addition of steps and path connections are similarly contemplated.

In embodiments, method 1100 involves establishing an initial baseline, continuously updating the baseline using an IIR filter, comparing the filtered data with a threshold to determine the state, and confirming the state through consistent measurements.

At step 1102, the mutual-capacitance sensing mechanism is activated. The activation step may include configuring sense channels nearest the folding structure 206, near the edge of the device, or both, on one portion of the foldable device 100 as drive lines 402, while simultaneously keeping the channels on the other portion of the foldable device 100 as sense lines 404. In embodiments, the selection of channels is based on which of the drive lines 402 or sense lines 404 are parallel to the folding axis 208. In embodiments, step 1102 is similar to step 1002 of method 1000.

At step 1104, touch controller 102 generates an initial baseline based on the 0° raw data stored in memory 112 at the factory. This baseline serves as a reference point for subsequent measurements.

At step 1106, the mutual capacitance raw data for the first frame is collected by the touch controller 102. The mutual capacitance raw data is subtracted from the baseline generated at step 1104 to arrive at a normalized mutual capacitance data set.

At step 1108, the normalized mutual capacitance data set for the first frame is compared to a threshold value to determine whether the foldable device 100 is fully open or fully closed.

At step 1110, touch controller 102 begins a loop operation for subsequent frames collected from the touch-sensing layer. In each iteration of the loop, touch controller 102 retrieves the N$^{th}$ frame raw data from the mutual capacitance sensing.

At step 1112, touch controller 102 retrieves the previous state of the foldable device 100. If the previous state was a closed position, method 1100 transitions to step 1114. Otherwise, if the previous state was an open position, method 1100 transitions to step 1116.

At step 1114, touch controller 102 updates the baseline value ($B_N$) of the N$^{th}$ frame to equal the N$^{th}$ frame mutual capacitance raw data ($RAW_N$). In embodiments, the N$^{th}$ frame mutual capacitance raw data is filtered using IIR filtering. In embodiments, the baseline value is updated with the N$^{th}$ frame mutual capacitance raw data that is filtered using a filtering different than IIR filtering.

In embodiments, updating the baseline value includes updating it based on the equation: $B_N = RAW_N \times WEIGHT + B_{N-1} \times (1-WEIGHT)$, where the WEIGHT is set to a value between 0 and 1 in a closed state and equals 0 (i.e., WEIGHT=0) in an open state—resulting in baseline tracking being stopped in the open state as the equation becomes $B_N = RAW_N \times 0 + B_{N-1} \times (1) = B_{N-1}$.

This helps to adapt the baseline to gradual changes over time. The method transitions to step 1118.

At step 1116, the baseline value from the previous iteration (N−1$^{th}$ frame) is retained. If the previous iteration is the first frame, the baseline value equals the initial baseline value measured at step 1104. The method transitions to step 1118.

At step 1118, the N$^{th}$ frame mutual capacitance raw data is normalized using the current baseline value by subtracting the raw data from the baseline. In embodiments, IIR filtering is used to filter out noisy datasets.

At step 1120, the filtered N$^{th}$ frame mutual capacitance data is compared to the threshold value. At step 1122, based on the comparison value, touch controller 102 determines whether the foldable device 100 is fully open or closed. Method 1100 transitions to step 1110 and repeats the process for the next frame.

Figure 12:
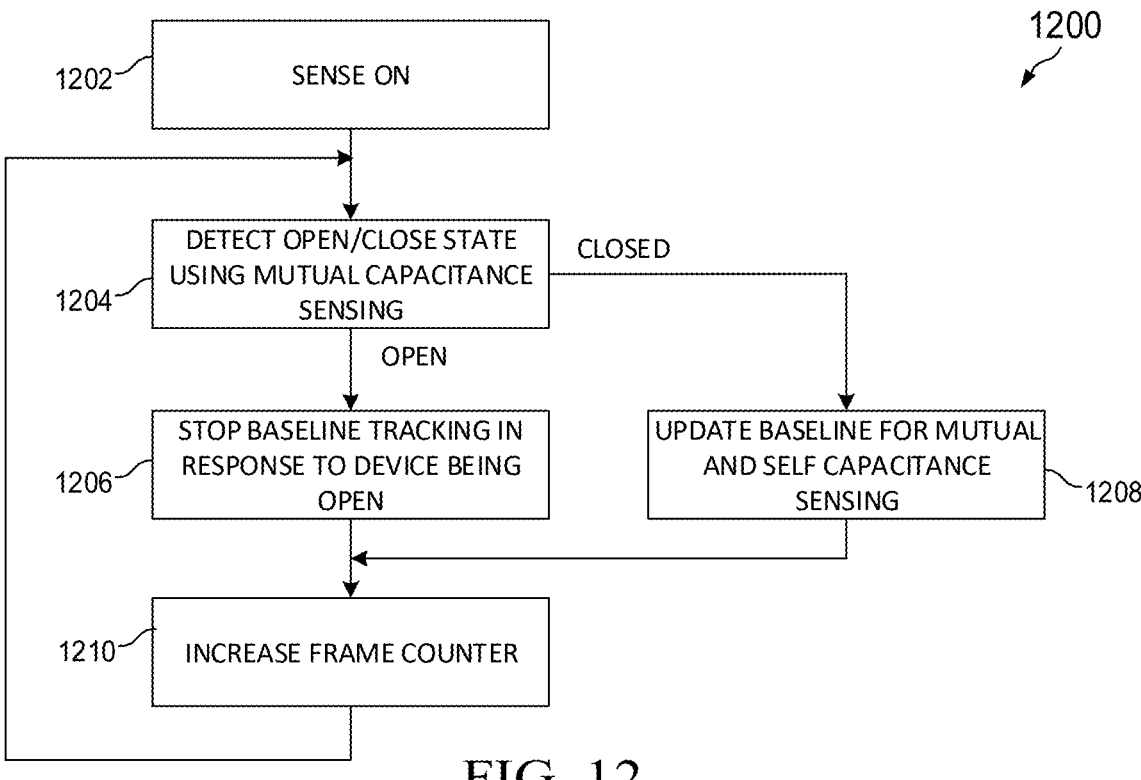
FIG. 12 is a flow chart of an embodiment method for baseline tracking for mutual and self-sensing using open and closed state detection based on mutual sensing.

FIG. 12 illustrates a flow chart of an embodiment method 1200 for baseline tracking for mutual and self-sensing using open and closed state detection based on mutual sensing. It is noted that all steps outlined in the flow chart of the method are not necessarily required and can be optional. Further, changes to the arrangement of the steps, removal of one or more steps and path connections, and addition of steps and path connections are similarly contemplated.

At step 1202, the mutual-capacitance and self-capacitance sensing mechanisms are activated. The activation step may include configuring sense channels nearest the folding structure 206, near the edge of the device, or both, on one portion of the foldable device 100 as drive lines 402, while simultaneously keeping the channels on the other portion of the foldable device 100 as sense lines 404. In embodiments, the selection of channels is based on which of the drive lines 402 or sense lines 404 are parallel to the folding axis 208. In embodiments, step 1102 is similar to step 1002 of method

1000. In embodiments, step 1102 further includes the steps discussed in step 602 of method 600.

At step 1204, method 1100 is performed to detect the current open or closed state of the foldable device 100. The method transitions to step 1206 if the current state of the foldable device 100 is in the fully open state. The method transitions to step 1208 if the current state of the foldable device 100 is in the fully closed state.

At step 1206, in response to the foldable device 100 being determined to be fully open, the baseline tracking for mutual and self-sensing is stopped. Accordingly, when the foldable device 100 is in the fully open position, touch controller 102 does not need to update the baseline.

At step 1208, in response to the foldable device 100 being determined to be fully closed, the baseline tracking for mutual and self-sensing is performed. The baseline tracking includes updating the baseline data from the current raw data collected using the mutual and self-capacitance techniques.

At step 1210, the frame counter is increased by one frame. The method returns to step 1204 for baseline tracking of the next frame.

Figure 13:
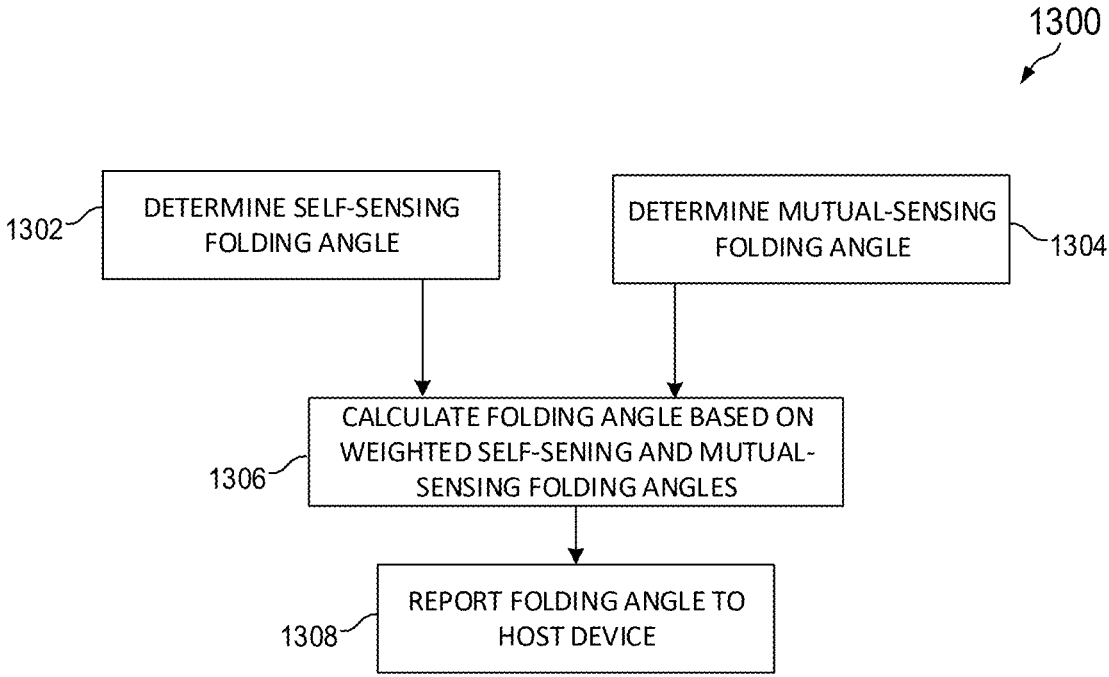
FIG. 13 is a flow chart of embodiment method for detecting the open and closed state of the foldable device based on mutual and self-capacitive sensing.

FIG. 13 illustrates a flow chart of embodiment method 1300 for detecting the open and closed state of the foldable device 100 based on mutual and self-capacitive sensing. It is noted that all steps outlined in the flow chart are not necessarily required and can be optional. Further, changes to the arrangement of the steps, removal of one or more steps and path connections, and addition of steps and path connections are similarly contemplated.

Method 1300 involves calculating the folding angle (θ) using self-capacitance and mutual capacitance sensing techniques.

At step 1302, touch controller 102 uses method 600 to determine the self-sensing folding angle using self-capacitance sensing for the current frame. Based on the application and the foldable device 100, a weight value is associated with the self-sensing folding angle.

At step 1304, simultaneously or separately, touch controller 102 uses method 1000 to determine the mutual-sensing folding angle using mutual-capacitance sensing for the current frame. Based on the application and the foldable device 100, a weight value is associated with the mutual-sensing folding angle.

At step 1306, touch controller 102 determines the folding angle (θ) of the foldable device 100 based on the weighted self-sensing folding angle and the weighted mutual-sensing folding angle. The weights for the self-sensing and mutual-sensing folding angles may be pre-determined during manufacturing and stored in memory 112, calculated routinely, dynamically, on-demand, or during startup using, for example, machine learning techniques, updated over-the-air (OTA), or the like.

At step 1308, touch controller 102 reports the folding angle (θ) determined at step 1306 to processor 110. Software applications and operating systems can utilize the folding angle information to trigger specific actions, adjust display configurations, or optimize performance based on the device's folding position. This can enable a more dynamic and personalized user experience that takes advantage of the unique folding capabilities of the device.

A first aspect relates to a method for determining a folding angle of a foldable device. The foldable device comprising a touch controller, a display layer, and a touch-sensing layer, the foldable device being foldable along a folding axis, a first portion of the display layer in contact with a second portion of the display layer in a fully closed position of the foldable device. The method includes activating, by the touch controller, a mutual-capacitance sensing mechanism of the foldable device, wherein the activating comprises configuring one or more channels of the touch-sensing layer parallel to the folding axis on the first portion of the display layer as transmit channels, and configuring one or more channels of the touch-sensing layer parallel to the folding axis on the second portion of the display layer as receive channels; collecting, by the touch controller, mutual-capacitance raw data measurements; determining, by the touch controller, the folding angle based on the mutual-capacitance raw data measurements; and activating a function or an application based on the folding angle.

In a first implementation form of the method according to the first aspect as such, the method further includes generating, by the touch controller, an initial baseline based on mutual-capacitance raw data measurements obtained at a first frame, the initial baseline corresponding to the foldable device being in the fully closed position; and performing, by the touch controller, frame processing to obtain normalized mutual-capacitance data for a current frame by subtracting current mutual-capacitance raw data from the initial baseline.

In a second implementation form of the method, according to the first aspect as such or any preceding implementation form of the first aspect, determining the folding angle based on the mutual-capacitance raw data measurements comprises mapping the normalized mutual-capacitance data to the folding angle using a lookup table or mathematical function.

In a third implementation form of the method, according to the first aspect as such or any preceding implementation form of the first aspect, the method further includes determining whether the normalized mutual-capacitance data falls within a valid range and, in response to the normalized mutual-capacitance data falling within the valid range, determining the folding angle based on the normalized mutual-capacitance data.

In a fourth implementation form of the method, according to the first aspect as such or any preceding implementation form of the first aspect, the method further includes filtering the normalized mutual-capacitance data prior to determining whether the normalized mutual-capacitance data falls within the valid range.

In a fifth implementation form of the method, according to the first aspect as such or any preceding implementation form of the first aspect, the filtering comprises using an Infinite Impulse Response (IIR) filter to smooth out noise or fluctuations in the normalized mutual-capacitance data.

In a sixth implementation form of the method, according to the first aspect as such or any preceding implementation form of the first aspect, the method further includes setting an invalid flag and skipping reporting of the folding angle for the current frame when the normalized mutual-capacitance data falls outside the valid range.

A second aspect relates to a foldable device. The foldable device includes a display layer have a first portion and a second portion, wherein the first portion is in contact with the second portion in a fully closed position of the foldable device, the foldable device being foldable along a folding axis; a touch-sensing layer disposed on an opposite surface of the first portion and the second portion of the display layer that is in contact with each other in the fully closed position, the touch-sensing layer comprising a plurality of drive lines and a plurality of sense lines arranged in a grid arrangement, the drive lines being orthogonal to the sense lines; a non-transitory memory storage comprising instructions; and a touch controller coupled to the touch-sensing layer and the non-transitory memory storage, the instructions, when executed by the touch controller, cause the foldable device to configure one or more drive lines or sense lines parallel to the folding axis on the first portion of the display layer as transmit channels, configure one or more drive lines or sense lines parallel to the folding axis on the second portion of the display layer as receive channels, collect mutual-capacitance raw data measurements, determine a folding angle of the foldable device based on the mutual-capacitance raw data measurements and, based thereon, activate a function or an application based on the folding angle.

In a first implementation form of the foldable device according to the second aspect as such, the sense lines are parallel with the folding axis, the sense lines being configured as transmit channels comprise a first subset of sense lines nearest to a folding structure on the first portion, and wherein the sense lines configured as receive channels comprises a second subset of sense lines nearest to the folding structure on the second portion.

In a second implementation form of the foldable device, according to the second aspect as such or any preceding implementation form of the second aspect, the drive lines are parallel with the folding axis, the drive lines being configured as transmit channels comprise a first subset of drive lines nearest to a folding structure on the first portion, and wherein the drive lines configured as receive channels comprises a second subset of drive lines nearest to the folding structure on the second portion.

In a third implementation form of the foldable device, according to the second aspect as such or any preceding implementation form of the second aspect, the one or more drive lines or sense lines on the first portion and the second portion comprises a first subset nearest a folding point of the foldable device and a second subset furthest away from the folding point.

In a fourth implementation form of the foldable device, according to the second aspect as such or any preceding implementation form of the second aspect, determining the folding angle based on the mutual-capacitance raw data measurements comprises determining the folding angle based on the mutual-capacitance raw data measurements of the first subset for a folding angle greater than zero; and determining whether the foldable device is in the fully closed position based on the mutual-capacitance raw data measurements of the second subset.

In a fifth implementation form of the foldable device, according to the second aspect as such or any preceding implementation form of the second aspect, activating the function or the application comprises utilizing the folding angle to trigger actions, adjust display configurations, or optimize a performance of the foldable device.

In a sixth implementation form of the foldable device, according to the second aspect as such or any preceding implementation form of the second aspect, the instructions, when executed by the touch controller, cause the foldable device to generating an initial baseline based on mutual-capacitance raw data measurements obtained at a first frame, the initial baseline corresponding to the foldable device being in the fully closed position; and performing frame processing to obtain normalized mutual-capacitance data for a current frame by subtracting current mutual-capacitance raw data from the initial baseline, wherein determining the folding angle based on the mutual-capacitance raw data measurements comprises mapping the normalized mutual-capacitance data to the folding angle using a lookup table or mathematical function.

A third aspect relates to a method for determining a folding angle of a foldable device, a first portion of a display layer of the foldable device being in contact with a second portion of the display layer in a fully closed position along a folding axis, the method comprising configuring one or more drive lines or sense lines of a touch-sensing layer parallel to the folding axis on the first portion of the display layer as transmit channels; configuring one or more drive lines or sense lines parallel to the folding axis on the second portion of the display layer as receive channels; collecting mutual-capacitance raw data measurements; and generating a filtered mutual-capacitance data set by performing a filtering operation on the mutual-capacitance raw data measurements; and determining the folding angle based on the filtered mutual-capacitance data set and, based thereon, activating a function or application based on the folding angle.

In a first implementation form of the method according to the third aspect as such, generating the filtered mutual-capacitance data set by performing the filtering operation on the mutual-capacitance raw data measurements comprises generating an initial baseline based on mutual-capacitance raw data measurements obtained at a first frame, the initial baseline corresponding to the foldable device being in the fully closed position, wherein the filtering operation comprises subtracting mutual-capacitance raw data from the initial baseline.

In a second implementation form of the method, according to the third aspect as such or any preceding implementation form of the third aspect, determining the folding angle based on the filtered mutual-capacitance data set comprises mapping the filtered mutual-capacitance data set to the folding angle using a lookup table or mathematical function.

In a third implementation form of the method, according to the third aspect as such or any preceding implementation form of the third aspect, the sense lines are parallel with the folding axis, the sense lines being configured as transmit channels comprise a first subset of sense lines nearest to a folding structure on the first portion, and wherein the sense lines configured as receive channels comprises a second subset of sense lines nearest to the folding structure on the second portion.

In a fourth implementation form of the method, according to the third aspect as such or any preceding implementation form of the third aspect, the drive lines are parallel with the folding axis, the drive lines being configured as transmit channels comprise a first subset of drive lines nearest to a folding structure on the first portion, and wherein the drive lines configured as receive channels comprises a second subset of drive lines nearest to the folding structure on the second portion.

In a fifth implementation form of the method, according to the third aspect as such or any preceding implementation form of the third aspect, the one or more drive lines or sense lines on the first portion and the second portion comprises a first subset nearest a folding point of the foldable device and a second subset furthest away from the folding point, and wherein determining the folding angle based on the mutual-capacitance raw data measurements comprises determining the folding angle based on the mutual-capacitance raw data measurements of the first subset for a folding angle greater than zero; and determining whether the foldable device is in the fully closed position based on the mutual-capacitance raw data measurements of the second subset.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for determining a folding angle of a foldable device, the foldable device comprising a touch controller, a display layer, and a touch-sensing layer, the foldable device being foldable along a folding axis, a first portion of the display layer in contact with a second portion of the display layer in a fully closed position of the foldable device, the method comprising:

activating, by the touch controller, a mutual-capacitance sensing mechanism of the foldable device, wherein the activating comprises:

configuring one or more channels of the touch-sensing layer parallel to the folding axis on the first portion of the display layer as transmit channels, and configuring one or more channels of the touch-sensing layer parallel to the folding axis on the second portion of the display layer as receive channels;

collecting, by the touch controller, mutual-capacitance raw data measurements;

generating, by the touch controller, an initial baseline based on mutual-capacitance raw data measurements obtained at a first frame, the initial baseline corresponding to the foldable device being in the fully closed position;

performing, by the touch controller, frame processing to obtain normalized mutual-capacitance data for a current frame by subtracting current mutual-capacitance raw data from the initial baseline;

determining whether the normalized mutual-capacitance data falls within a valid range;

determining, by the touch controller, the folding angle based on the mutual-capacitance raw data measurements and, in response to the normalized mutual-capacitance data falling within the valid range, the normalized mutual-capacitance data; and setting an invalid flag and skipping reporting of the folding angle for the current frame in response to the normalized mutual-capacitance data falling outside the valid range.

2. The method of claim 1, wherein determining the folding angle based on the mutual-capacitance raw data measurements comprises mapping the normalized mutual-capacitance data to the folding angle using a lookup table or mathematical function.

3. The method of claim 1, further comprising filtering the normalized mutual-capacitance data prior to determining whether the normalized mutual-capacitance data falls within the valid range.

4. The method of claim 3, wherein the filtering comprises using an Infinite Impulse Response (IIR) filter to smooth out noise or fluctuations in the normalized mutual-capacitance data.

5. The method of claim 1, further comprising activating a function or an application based on the folding angle.

6. The method of claim 1, wherein determining the folding angle based on the normalized mutual-capacitance data comprises mapping the normalized mutual-capacitance data to the folding angle using a lookup table or mathematical function.

7. A foldable device, comprising:
a display layer comprising a first portion and a second portion, wherein the first portion is in contact with the second portion in a fully closed position of the foldable device, the foldable device being foldable along a folding axis;
a touch-sensing layer disposed on an opposite surface of the first portion and the second portion of the display layer that is in contact with each other in the fully closed position, the touch-sensing layer comprising a plurality of drive lines and a plurality of sense lines arranged in a grid arrangement, the drive lines being orthogonal to the sense lines;
a non-transitory memory storage comprising instructions; and
a touch controller coupled to the touch-sensing layer and the non-transitory memory storage, the instructions, when executed by the touch controller, cause the foldable device to:
configure one or more drive lines or sense lines parallel to the folding axis on the first portion of the display layer as transmit channels,
configure one or more drive lines or sense lines parallel to the folding axis on the second portion of the display layer as receive channels,
collect mutual-capacitance raw data measurements,
generate an initial baseline based on mutual-capacitance raw data measurements obtained at a first frame, the initial baseline corresponding to the foldable device being in the fully closed position,
perform frame processing to obtain normalized mutual-capacitance data for a current frame by subtracting current mutual-capacitance raw data from the initial baseline,
determine whether the normalized mutual-capacitance data falls within a valid range,
determine a folding angle of the foldable device based on the mutual-capacitance raw data measurements and, in response to the normalized mutual-capacitance data falling within the valid range, the normalized mutual-capacitance data, and
set an invalid flag and skip reporting of the folding angle for the current frame in response to the normalized mutual-capacitance data falling outside the valid range.

8. The foldable device of claim 7, wherein the sense lines are parallel with the folding axis, the sense lines being configured as transmit channels comprise a first subset of sense lines nearest to a folding structure on the first portion, and wherein the sense lines configured as receive channels comprise a second subset of sense lines nearest to the folding structure on the second portion.

9. The foldable device of claim 7, wherein the drive lines are parallel with the folding axis, the drive lines being configured as transmit channels comprise a first subset of drive lines nearest to a folding structure on the first portion, and wherein the drive lines configured as receive channels comprise a second subset of drive lines nearest to the folding structure on the second portion.

10. The foldable device of claim 7, wherein the one or more drive lines or sense lines on the first portion and the second portion comprises a first subset nearest to a folding point of the foldable device and a second subset furthest away from the folding point.

11. The foldable device of claim 10, wherein determining the folding angle based on the mutual-capacitance raw data measurements comprises:
determining the folding angle based on the mutual-capacitance raw data measurements of the first subset for a folding angle greater than zero; and
determining whether the foldable device is in the fully closed position based on the mutual-capacitance raw data measurements of the second subset.

12. The foldable device of claim 7, wherein the instructions, when executed by the touch controller, cause the foldable device to activate a function or an application based on the folding angle.

13. The foldable device of claim 12, wherein activating the function or the application comprises utilizing the folding angle to trigger action, adjust display configuration, or optimize a performance of the foldable device.

14. The foldable device of claim 7, wherein determining the folding angle based on the mutual-capacitance raw data measurements comprises mapping the normalized mutual-capacitance data to the folding angle using a lookup table or mathematical function.

15. A method for determining a folding angle of a foldable device, a first portion of a display layer of the foldable device being in contact with a second portion of the display layer in a fully closed position along a folding axis, the method comprising:
configuring one or more drive lines or sense lines of a touch-sensing layer parallel to the folding axis on the first portion of the display layer as transmit channels;
configuring one or more drive lines or sense lines parallel to the folding axis on the second portion of the display layer as receive channels;
collecting mutual-capacitance raw data measurements;
generating an initial baseline based on mutual-capacitance raw data measurements obtained at a first frame, the initial baseline corresponding to the foldable device being in the fully closed position;
performing frame processing to obtain normalized mutual-capacitance data for a current frame by subtracting current mutual-capacitance raw data from the initial baseline;
determining whether the normalized mutual-capacitance data falls within a valid range;
generating a filtered mutual-capacitance data set by performing a filtering operation on the mutual-capacitance raw data measurements;
determining the folding angle based on the filtered mutual-capacitance data set and, in response to the normalized mutual-capacitance data falling within the valid range, the normalized mutual-capacitance data; and setting an invalid flag and skipping reporting of the folding angle for the current frame in response to the normalized mutual-capacitance data falling outside the valid range.

16. The method of claim 15, wherein determining the folding angle based on the filtered mutual-capacitance data set comprises mapping the filtered mutual-capacitance data set to the folding angle using a lookup table or mathematical function.

17. The method of claim 15, wherein the sense lines are parallel with the folding axis, the sense lines being configured as transmit channels comprise a first subset of sense lines nearest to a folding structure on the first portion, and wherein the sense lines configured as receive channels comprise a second subset of sense lines nearest to the folding structure on the second portion.

18. The method of claim 15, wherein the drive lines are parallel with the folding axis, the drive lines being configured as transmit channels comprise a first subset of drive lines nearest to a folding structure on the first portion, and wherein the drive lines configured as receive channels comprise a second subset of drive lines nearest to the folding structure on the second portion.

19. The method of claim 15, wherein the one or more drive lines or sense lines on the first portion and the second portion comprises a first subset nearest to a folding point of the foldable device and a second subset furthest away from the folding point, and wherein determining the folding angle based on the mutual-capacitance raw data measurements comprises:

determining the folding angle based on the mutual-capacitance raw data measurements of the first subset for a folding angle greater than zero; and determining whether the foldable device is in the fully closed position based on the mutual-capacitance raw data measurements of the second subset.

20. The method of claim 15, wherein the filtering operation comprises using an Infinite Impulse Response (IIR) filter to smooth out noise or fluctuations in the normalized mutual-capacitance data.

* * * * *